United States Patent Office 3,373,126
Patented Mar. 12, 1968

3,373,126
STARCH COMPOSITION CONTAINING HYDROPHOBIC POLYTETRAFLUOROETHYLENE PARTICLES
David Lehrman, Cheltenham, Pa., and Joseph J. Shay, Wilmington, Del., assignors to The Ironees Company, Philadelphia, Pa., a corporation of Pennsylvania
No Drawing. Filed Sept. 20, 1965, Ser. No. 488,806
3 Claims. (Cl. 260—17.4)

The present invention is directed to a starch composition, and more particularly to a liquid laundry starch composition which avoids sticking trouble on pressing.

The use of starch for starching and sizing of fabrics is ancient. In recent years, liquid laundry starches have become increasingly popular, particularly for home laundry use, since starch in this form obviates the need for preparing a starch dispersion each time starch is needed. Thus, a wide variety of liquid laundry starches are presently commercially available.

Unfortunately, conventional liquid laundry starches suffer from a number of serious handicaps. Thus, sticking trouble on pressing or ironing is a very common problem encountered with liquid laundry starch compositions. A large amount of effort has been expended on the development of lubricants for liquid laundry starches, and a variety of such lubricants, such as paraffin wax, Japan wax, and beeswax have been used for this purpose. Problems have arisen with the use of such lubricants, such as interference with the penetration of the starch into the fabric, with resultant smears and highlights. In addition, many prior liquid starch compositions containing lubricants confer a soft, mushy feel and undesirable hand on the fabrics.

This invention has as an object the provision of a novel liquid laundry starch composition.

This invention has as another object the provision of a liquid laundry starch composition which substantially eliminates sticking trouble when ironing.

This invention has as a still further object the provision of a liquid starch composition which achieves good penetration into a fabric.

This invention has as a further object the provision of a liquid starch composition which is stable on standing.

Other objects will appear hereinafter.

The liquid starch compositions of the present invention may be applied as a liquid, or as an aerosol spray. The liquid starch composition of the present invention may be applied by any of the methods conventionally used to apply starch, as by way of example, by washwheel, starching machine, hand-dipping, spraying, etc.

The liquid starch compositions of the present invention comprise from 2 to 25 weight percent of starch and from ½ to 6 weight percent of Teflon based on the amount of starch present in the composition, with the Teflon being present in the form of Teflon 30 or Teflon 30B.

In addition, in preferred embodiments, the starch compositions of the present invention include a surface active agent and bactericide (the same material may serve both purposes), an anti-thawing agent, such as borax, and a release agent, such as a silicone emulsion. Furthermore, the liquid laundry starch compositions of the present invention may include water softeners, soaps, dyes, whitening agents, and perfumes and other like additives which are frequently added to starch preparations. The grain starches, wheat, corn, and rice are most commonly used, although the root starches, such as sago, tapioca, potato and the like are relatively infrequently used. Normally, the laundry starch preparations of the present invention will have a cornstarch base, but for optimum starch properties, it is frequently desirable to blend the cornstarch with wheat starch and rice starch. Thus, wheat starch confers toughness and better flexibility, and rice starch confers penetrating qualities. The use of starch blends is well known to those in the art, and forms no part of the present invention.

The nature of the Teflon, and its concentration, is critical in terms of the present invention. Thus, the Teflon retards or entirely prevents ironing sticking. However, since Teflon is not transparent, its concentration limits are critical. More than 6 weight percent of the Teflon based on the total amount of starch present in the composition will produce a smear or highlight in the starched fabric. A concentration of Teflon of below ½ weight percent based on the starch will generally be so low as to fail to confer the benefits of resisting or avoiding sticking.

The nature of the Teflon is likewise critical. We have found that the Teflon must be in the form of a hydrophobic aqueous dispersion of negatively charged colloidal particles having a diameter of between 0.05 to 0.5 micron. Teflon is a tetrafluoroethylene resin. Suitable dispersions for use in the present invention are commercially available in the form of Teflon 30 and Teflon 30B from E. I. du Pont de Nemours & Co. (Inc.), Wilmington, Del. In the form sold, these dispersions comprise aqueous dispersions containing between 59 and 61 weight percent of solids, and from 5.5 to 6.5 weight percent of a non-ionic wetting agent, such as Triton X-100. Triton X-100 has the general formula:

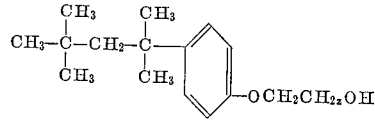

X=9–10 for Triton X-100.

The properties of Teflon 30 and 30B have been published in the DuPont technical literature. Teflon 30 and 30B have a pH of about 10, a viscosity of about 15 centipoises at room temperature. The Teflon is dispersed as negatively charged colloidal particles within the aforesaid size range of 0.05 to 0.5 micron. At 77° F. Teflon 30 and Teflon 30B have a specific gravity of 1.24 when 35 percent solids are present; a specific gravity of 1.29 when 40 percent solids are present; a specific gravity of 1.34 when 45 percent solids are present; a specific gravity of 1.38 when 50 percent solids are present; and a specific gravity of 1.50 when 60 percent solids are present. Typical properties of thin films cast from Teflon 30 or Teflon 30B are as follows:

| Property | Units | A.S.T.M. Method | |
|---|---|---|---|
| Specific gravity | | D792–50 | 2.15–2.20 |
| Tensile strength, 77° F | Lb./sq. in | D882–56T | 3,000–4,000 |
| Elongation, 77° F | Percent | D882–56T | 300–500 |
| Tear strength | Lb./in | D624–48 | 400–800 |
| Stiffness, 77° F | Lb./sq. in | D747–48T | 40,000–90,000 |
| Moisture-permeability (0.001 in. thickness) | Gms./100 sq. in./day | | 0.2 |
| Dielectric constant, 100 cycles | | D150–54T | 2.0–2.2 |
| Power factor, 100 cycles | | D150–54T | <0.0003 |
| Volume resistivity | Ohm.-cm | D149–44 | >10¹ |
| Dielectric strength [1] | V/Mil | D149–44 | 3,000–4,500 |
| Electric Flaws at 800 volts/mil | Flaws/100 ft./½" width | D1389–56T modified | [2] 0–8 |
| Water absorption | Percent | D570–54T | <.01 |
| Brittleness temperature | ° F | | <–100 |

[1] 1.4 Mil Films.  [2] Varies with Film thickness.

The liquid starch composition of the present invention should include a bactericide. A wide variety of suitable bactericides may be present, many of which are also surface active agents and hence serve the dual function of being both a germicide and improving the penetration of the liquid starch composition. Examples of germicides which may be used in the compositions of the present invention include di-isobutyl phenoxy ethoxy ethyl dimethyl benzyl ammonium chloride monohydrate, which is both a bactericide and a cationic surface active agent, or other germicide of the type of o-phenylphenol or its sodium salt may be used. The amount of bactericide which should be present in the laundry starch compositions of the present invention should be equivalent to approximately 0.1 weight percent of di-isobutyl phenoxy ethoxy ethyl dimethyl benzyl ammonium chloride monohydrate. It will be appreciated by those skilled in the art that the concentration of the bactericide is not critical.

As above-indicated an anti-thawing agent, such as borax, should be present. A wide variety of anti-thawing agents or starch stabilizers have been used by the art, and may be used in the laundry starch compositions of the present invention. By way of example, these include mixtures of borax and boric acids, such as the mixtures disclosed in United States Patent 2,994,615 issued Aug. 1, 1961 to John W. McDonald, and equivalent concentrations of sodium nitrite or other salts.

The addition of a release agent is desirable although not essential. A wide variety of release agents are commercially available. We prefer the use of a silicone emulsion release agent of a silicone having a high viscosity, namely of about 10,000 centistokes. By way of example, we have used the General Electric silicone emulsion SM–2040, whose characteristics and properties are given in General Electric Silicone Products Department Data Book S–12–1. As heretofore indicated, the laundry starch compositions of the present invention may be used in aerosol compositions, or in liquid compositions. When used in aerosol compositions, a wide variety of propellants, such as isobutane, nitrogen, fluorocarbon, nitrous oxide, or the like may be used. The propellant may be present in the normal concentrations used in such compositions, such as of the order of from 2 to 8 weight percent, and most frequently of the order of 2.5 to 4 weight percent.

For a more complete understanding of the nature and scope of the invention, reference may now be had to the following detailed description thereof wherein certain presently preferred formulations are set forth in the examples not only for the purpose of instructing those skilled in art as to the manner in which the invention may be practiced but also to suggest to them other embodiments of a similar nature coming within the scope of the claims.

The liquid laundry starch compositions of the present invention may be prepared by blending uncooked starch with water to form a slurry at room temperature. The anti-thawing agent, germicide, surface active agents, and dyes may also be incorporated into the slurry by agitation at room temperature.

The slurry should then be heated to the temperature of 190° F. to 200° F. and maintained there for about 15 minutes. This will cause the starch to swell. The concentration of the starch solution can then be adjusted with water to the desired concentration. By way of example, the initial concentration of the starch may be of the order of 10 weight percent and may be adjusted to a desired 4 weight percent at this point.

After the solution has been diluted, it is allowed to cool, and when the temperature drops below 130° F. the Teflon 30 or Teflon 30B is added to the mixture. It is preferable to add the Teflon at a temperature of 130° F. or below, since Teflon 30 or Teflon 30B will settle on prolonged heating above 150° F., although it can be redispersed by mild agitation. When the temperature of the starch solution has dropped below 100° F. the silicone and the perfume are added.

Reference may now be had to the following examples for more detailed information as to preferred and illustrative embodiments of the invention.

Example 1

A suitable starch aerosol formulation in accordance with the present invention is as follows:

| | Wt. percent |
|---|---|
| Starch | 3.90 |
| Borax | 0.4680 |
| Silicone SM–2040 | 0.164 |
| Teflon 30 | 0.10 |
| Di-isobutyl phenoxy ethoxy ethyl dimethyl benzyl ammonium chloride monohydrate | 0.10 |
| Water | 92.7185 |
| Perfume | 0.0495 |
| Isobutane propellant | 2.5 |

Example 2

Another starch aerosol formula is:

| | |
|---|---|
| Starch | 5.90 |
| Borax | 0.50 |
| Orthoboric acid | 0.50 |
| Silicone SM–2040 | 0.2 |
| Teflon 30 | 0.15 |
| o-Phenylphenol | 0.10 |
| Perfume | 0.05 |
| Water | 89.0 |
| Freon propellant | 3.6 |

Example 3

Another starch aerosol formula is as follows:

| | |
|---|---|
| Starch | 7.0 |
| Borax | 0.85 |
| Silicone SM–2040 | 0.30 |
| Teflon 30B | 0.20 |
| Di-isobutyl phenoxy ethoxy ethyl dimethyl benzyl ammonium chloride monohydrate | 0.18 |
| Perfume | 0.07 |
| Water | 88.7 |
| Nitrous oxide | 3.0 |

Example 4

A suitable liquid laundry starch product for use with hand-dipping or other conventional laundry operation is as follows:

| | Wt. percent |
|---|---|
| Starch | 22.2 |
| Borax | 2.7 |
| Silicone SM–2040 | .95 |
| Teflon 30 | .65 |
| Di-isobutyl phenoxy ethoxy ethyl dimethyl benzyl ammonium chloride monohydrate | .60 |
| Perfume | 0.1 |
| Water | 72.8 |

The present invention may be embodied in other specific forms without departing from the spirit or essential attributes thereof and, accordingly, reference should be made to the appended claims, rather than to the foregoing specification as indicating the scope of the invention.

We claim:

1. A liquid laundry starch composition having superior anti-sticking pressing properties comprising an aqueous mixture of 2 to 25 weight percent of starch and from ½ to 6 percent by weight based on the starch of tetrafluoroethylene resin in the form of a hydrophobic negatively charged colloidal dispersion of particles having a diameter of between 0.05 and 0.5 micron.

2. A liquid laundry starch composition in accordance with claim 1 which contains between 5.5 and 6.5 percent by weight based on the tetrafluoroethylene resin of a nonionic wetting agent.

3. A liquid laundry starch composition in accordance with claim 2 which includes a sufficient amount of an anti-thawing agent to confer anti-thawing properties on the composition, a sufficient amount of bactericide to confer shelf stability on the composition, a perfume, and from 2 to 8 weight percent of an aerosol propellant, whereby the composition may be sprayed from an aerosol container.

References Cited
UNITED STATES PATENTS 3,038,870   6/1962   Schott _____ 260—17.4

WILLIAM H. SHORT, *Primary Examiner.*

J. NORRIS, *Assistant Examiner.*